(12) United States Patent
Castrillo et al.

(10) Patent No.: US 12,417,161 B2
(45) Date of Patent: Sep. 16, 2025

(54) PATCH AND ELIDED FIDELITY ESTIMATION

(71) Applicant: Google LLC, Mountain View, CA (US)

(72) Inventors: Sergio Boixo Castrillo, Rancho Palos Verdes, CA (US); Craig Gidney, Goleta, CA (US); Adam Zalcman, Goleta, CA (US)

(73) Assignee: Google LLC, Mountain View, CA (US)

( * ) Notice: Subject to any disclaimer, the term of this patent is extended or adjusted under 35 U.S.C. 154(b) by 932 days.

(21) Appl. No.: 17/623,399

(22) PCT Filed: Oct. 23, 2019

(86) PCT No.: PCT/US2019/057668
§ 371 (c)(1),
(2) Date: Dec. 28, 2021

(87) PCT Pub. No.: WO2020/263299
PCT Pub. Date: Dec. 30, 2020

(65) Prior Publication Data
US 2022/0383180 A1    Dec. 1, 2022

Related U.S. Application Data

(60) Provisional application No. 62/868,545, filed on Jun. 28, 2019.

(51) Int. Cl.
*G06N 10/70* (2022.01)
*G06F 11/34* (2006.01)
*G06N 10/20* (2022.01)

(52) U.S. Cl.
CPC ......... *G06F 11/3428* (2013.01); *G06N 10/20* (2022.01); *G06N 10/70* (2022.01)

(58) Field of Classification Search
CPC ..... G06F 11/3428; G06N 10/20; G06N 10/70
See application file for complete search history.

(56) References Cited

U.S. PATENT DOCUMENTS

2022/0084085 A1*  3/2022  Rigetti .............. H04M 15/8214

FOREIGN PATENT DOCUMENTS

| CN | 106164942 | 11/2016 |
|---|---|---|
| CN | 109643398 | 4/2019 |

OTHER PUBLICATIONS

Boixo et al., "Characterizing Quantum Supremacy in Near-Term Devices," arXiv, Jul. 31, 2016, 23 pages.
(Continued)

*Primary Examiner* — Nghia M Doan
(74) *Attorney, Agent, or Firm* — Fish & Richardson P.C.

(57) ABSTRACT

Methods, systems and apparatus for estimating quantum processor performance. In one aspect, a method includes defining a benchmarking circuit configured to operate on an array of qubits, wherein the benchmarking circuit comprises one or more cycles of quantum gates, each cycle comprising a respective layer of randomly sampled single-qubit gates and a layer of multiple instances of a same multi-qubit gate; partitioning the defined benchmarking circuit into two or more sub-circuits, comprising: defining one or more boundaries between qubits in the array of qubits, removing instances of the multi-qubit gate that cross the defined one or more boundaries to create the two or more sub-circuits; performing a benchmarking process using the partitioned benchmarking circuit to estimate a respective circuit fidelity of each of the sub-circuits; and multiplying the estimated circuit fidelities of each of the sub-circuits to obtain an estimate of the fidelity of the quantum processor.

11 Claims, 4 Drawing Sheets

(56) References Cited

OTHER PUBLICATIONS

Markov et al., "Quantum Supremacy is Both Closer and Farther Than It Appears," arXiv, Sep. 26, 2018, 32 pages.
Office Action in Australian Appln. No. 2019454277, dated Nov. 8, 2022, 3 pages.
Office Action in Canadian Appln. No. 3144696, dated Jan. 25, 2023, 5 pages.
Villalonga et al., "A flexible high-performance simulator for the verification and benchmarking of quantum circuits implemented on real hardware," arXiv, Oct. 10, 2019, 24 pages.
Office Action in Chinese Appln. No. 201980097996.3, mailed on Aug. 30, 2024, 16 pages (with English translation).
Office Action in Chinese Appln. No. 201980097996.3, mailed on Apr. 10, 2025, 17 pages (with English machine translation).

\* cited by examiner

200

```
┌─────────────────────────────────────────────┐
│ Define a benchmarking quantum circuit        │
│ configured to operate on an array of qubits,│
│ where the benchmarking quantum circuit       │
│ includes one or more cycles of quantum       │
│ gates, each cycle including a layer of       │
│ randomly sampled single qubit gates and a    │
│ layer of multiple instances of a multi qubit │
│ gate                                         │
│                                          202 │
└─────────────────────────────────────────────┘
                      ↓
┌─────────────────────────────────────────────┐
│ Partition the defined benchmarking quantum   │
│ circuit into two or more sub circuits by     │
│ defining one or more boundaries in the array │
│ of qubits and removing instances of the      │
│ multi qubit gate that cross the defined one  │
│ or more boundaries                           │
│                                          204 │
└─────────────────────────────────────────────┘
                      ↓
┌─────────────────────────────────────────────┐
│ Perform a benchmarking process using the     │
│ partitioned benchmarking quantum circuit to  │
│ estimate a respective circuit fidelity of    │
│ each of the sub circuits                     │
│                                          206 │
└─────────────────────────────────────────────┘
                      ↓
┌─────────────────────────────────────────────┐
│ Multiply the estimated fidelities of each    │
│ sub circuit to obtain an estimate of the     │
│ fidelity of the defined benchmarking         │
│ quantum circuit                              │
│                                          208 │
└─────────────────────────────────────────────┘
```

```
Define a benchmarking quantum circuit configured to operate
on an array of qubits, where the benchmarking quantum
circuit includes one or more cycles of quantum gates, each
cycle including a layer of randomly sampled single qubit
gates and a layer of multiple instances of a multi qubit gate
                                                          302
```

```
Modify the defined benchmarking quantum circuit by defining
one or more boundaries in the array of qubits and removing a
proper subset of instances of the multi qubit gate that cross
            the defined one or more boundaries
                                                          304
```

```
Perform a benchmarking process using the modified
benchmarking quantum circuit to estimate a fidelity of the
     defined benchmarking quantum circuit
                                                 306
```

FIG. 3

PATCH AND ELIDED FIDELITY ESTIMATION

CROSS-REFERENCE TO RELATED APPLICATION

This application is a National Stage Application under 35 U.S.C. § 371 and claims the benefit of International Application No. PCT/US2019/057668, filed on Oct. 23, 2019, which claims priority to U.S. Provisional Application Ser. No. 62/868,545, filed on Jun. 28, 2019. The disclosures of the prior applications are considered part of and are incorporated by reference in the disclosure of this application.

BACKGROUND

This specification relates to quantum computing.

Quantum computing uses quantum-mechanical phenomena such as superposition and entanglement to perform computations. A quantum circuit is one example model for quantum computation in which a computation is a sequence of quantum logic gates, which are reversible transformations on a quantum mechanical analog of an n-bit register.

SUMMARY

This specification describes techniques for estimating the fidelity of a quantum computer.

In general, one innovative aspect of the subject matter described in this specification can be implemented in a method for estimating quantum processor performance, the method comprising: defining a benchmarking quantum circuit configured to operate on an array of qubits, wherein the benchmarking quantum circuit comprises one or more cycles of quantum gates, each cycle of quantum gates comprising a respective layer of randomly sampled single qubit gates and a layer of multiple instances of a same multi-qubit gate; partitioning the defined benchmarking quantum circuit into two or more sub-circuits, comprising: defining one or more boundaries between qubits in the array of qubits, removing instances of the multi-qubit gate that cross the defined one or more boundaries to create the two or more sub-circuits, each sub-circuit being a circuit that does not cross any of the defined one or more boundaries; performing a benchmarking process using the partitioned benchmarking quantum circuit to estimate a respective circuit fidelity of each of the two or more sub-circuits; and multiplying the estimated circuit fidelities of each of the two or more sub-circuits to obtain an estimate of the fidelity of the defined benchmarking quantum circuit.

Other implementations of this aspect include corresponding classical and quantum computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations defining the benchmarking quantum circuit comprises: randomly sampling multiple single-qubit quantum gates from a predetermined set of single-qubit quantum gates, wherein each randomly sampled single-qubit quantum gate corresponds to a respective qubit in the array of qubits and to a respective cycle of the one or more cycles; assigning the randomly sampled multiple single-qubit quantum gates to respective layers of randomly sampled single qubit gates in the defined benchmarking quantum circuit; and assigning instances of the multi-qubit gate to the layers of multiple instances of the same multi-qubit gate.

In some implementations each layer of multiple instances of the multi-qubit quantum gate comprises multiple copies of a two-qubit gate, wherein each copy of the two-qubit gate operates on a respective pair of nearest neighboring qubits in the array of qubits.

In some implementations the multiple copies of the two-qubit gate operate on all pairs of neighboring qubits in the array of qubits.

In some implementations the two or more sub-circuits comprise disjoint sub-circuits that respectively operate on disjoint subsets of qubits in the array of qubits.

In some implementations performing a benchmarking process using the partitioned benchmarking quantum circuit to determine a respective circuit fidelity of each of the two or more sub-circuits comprises: implementing the partitioned benchmarking quantum circuit using quantum computing hardware to obtain experimental benchmarking data; classically simulating an ideal implementation of the partitioned benchmarking quantum circuit, comprising performing separate simulations of ideal implementations of each of the two or more sub-circuits to obtain respective sets of classical benchmarking data that each represent an output distribution of an ideal implementation of a respective sub-circuit; comparing, for each sub-circuit, classical benchmarking data for the sub-circuit to corresponding portions of the obtained experimental data to determine an estimated fidelity of the sub-circuit.

In some implementations implementing the partitioned benchmarking quantum circuit using quantum computing hardware to obtain experimental benchmarking data comprises: initializing each qubit in the array of qubits in an initial state; applying the partitioned benchmarking quantum circuit to the initialized qubits; and measuring each qubit in the array of qubits to obtain measurement data for each qubit.

In some implementations the method further comprises applying a Hadamard gate to each qubit after initializing each qubits in the array of qubits in the initial state and before the partitioned benchmarking quantum circuit is applied.

In some implementations applying the partitioned benchmarking quantum circuit to the initialized qubits comprises performing a single experiment where each of the two or more sub-circuits are implemented approximately simultaneously.

In some implementations the method further comprises defining multiple benchmarking quantum circuits configured to operate on the array of qubits, wherein the defined multiple benchmarking quantum circuits comprise quantum circuits with different circuit depths from a predetermined range of circuit depths; and estimating the fidelity of each defined benchmarking quantum circuit.

In some implementations the method further comprises determining one or more adjustments to quantum hardware control parameters based on the obtained estimate of the fidelity of the defined benchmarking quantum circuit; and implementing the determined one or more adjustments to perform quantum computations using quantum computing hardware.

In general, another innovative aspect of the subject matter described in this specification can be implemented in a method for estimating quantum processor performance, the method comprising: defining a benchmarking quantum circuit configured to operate on an array of qubits, wherein the benchmarking quantum circuit comprises one or more cycles of quantum gates, each cycle of quantum gates comprising a respective layer of randomly sampled single qubit gates and a layer of multiple instances of a same multi-qubit gate; modifying the defined benchmarking quantum circuit, comprising: defining one or more boundaries between qubits in the array of qubits, removing a proper subset of instances of the multi-qubit gate that cross the defined one or more boundaries; and performing a benchmarking process using the modified benchmarking quantum circuit to estimate a fidelity of the defined benchmarking quantum circuit.

Other implementations of this aspect include corresponding classical and quantum computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations removing a proper subset of instances of the multi-qubit gate that cross the defined one or more boundaries comprises removing a proper subset of instances of the multi-qubit quantum gate that cross the one or more boundaries in a predetermined number of cycles of quantum gates.

In some implementations defining the benchmarking quantum circuit comprises: randomly sampling multiple single-qubit quantum gates from a predetermined set of single-qubit quantum gates, wherein each randomly sampled single-qubit quantum gate corresponds to a respective qubit in the array of qubits and to a respective cycle of the one or more cycles; assigning the randomly sampled multiple single-qubit quantum gates to respective layers of randomly sampled single qubit gates in the defined benchmarking quantum circuit; and assigning instances of the multi-qubit gate to the layers of multiple instances of the same multi-qubit gate.

In some implementations each layer of multiple instances of the multi-qubit quantum gate comprises multiple copies of a two-qubit gate, wherein each copy of the two-qubit gate operates on a respective pair of nearest neighboring qubits in the array of qubits.

In some implementations the multiple copies of the two-qubit gate operate on all pairs of neighboring qubits in the array of qubits.

In some implementations performing a benchmarking process using the modified benchmarking quantum circuit to estimate a fidelity of the defined benchmarking quantum circuit comprises: implementing the modified benchmarking quantum circuit using quantum computing hardware to obtain experimental benchmarking data; classically simulating an ideal implementation of the modified benchmarking quantum circuit, comprising performing a Schrödinger-Feynman algorithm to obtain classical benchmarking data; comparing the classical benchmarking data the experimental data to determine an estimated fidelity of the defined benchmarking quantum circuit.

In some implementations implementing the modified benchmarking quantum circuit using quantum computing hardware to obtain experimental benchmarking data comprises: initializing each qubit in the array of qubits in an initial state; applying the modified benchmarking quantum circuit to the initialized qubits; and measuring each qubit in the array of qubits to obtain measurement data for each qubit.

In some implementations the method further comprises applying a Hadamard gate to each qubit after initializing each qubits in the array of qubits in the initial state and before the modified benchmarking quantum circuit is applied.

In some implementations the method further comprises defining multiple benchmarking quantum circuits configured to operate on the array of qubits, wherein the defined multiple benchmarking quantum circuits comprise quantum circuits with different circuit depths from a predetermined range of circuit depths; and estimating the fidelity of each defined benchmarking quantum circuit.

In some implementations the method further comprises determining one or more adjustments to quantum hardware control parameters based on the obtained estimate of the fidelity of the defined benchmarking quantum circuit; and implementing the determined one or more adjustments to perform quantum computations using quantum computing hardware.

The subject matter described in this specification can be implemented in particular ways so as to realize one or more of the following advantages.

A system implementing the presently described techniques can determine accurate estimates of system fidelity with controllable classical computation cost. In particular, the presently described techniques provide an exponential reduction in computational cost. Therefore, a system implementing the presently described techniques can quickly obtain estimates of large-scale system performance on a day-to-day basis, including for system sizes too large to be simulated with classical algorithms.

In addition, the presently described techniques determine more accurate estimates of large-scale system performance compared to conventional techniques because the presently described techniques use circuit instances that are similar to other instances that cannot be simulated to estimate the fidelity. The presently described techniques are also scalable and can be extended to arbitrary numbers of qubits while keeping the analysis time at most linear in the number of qubits (or in some cases constant).

The presently described techniques can be applied to improve quantum computing hardware and quantum control—a critical feature of high fidelity quantum computing. For example, adjustments to control models that can improve the accuracy at which the quantum computing hardware performs quantum operations can be determined based on estimated fidelities of quantum states produced by the quantum computing hardware.

Details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of a first example process for estimating quantum processor performance.

FIG. 3 is a flow diagram of a second example process for estimating quantum processor performance.

DETAILED DESCRIPTION

Overview

Figure 1:
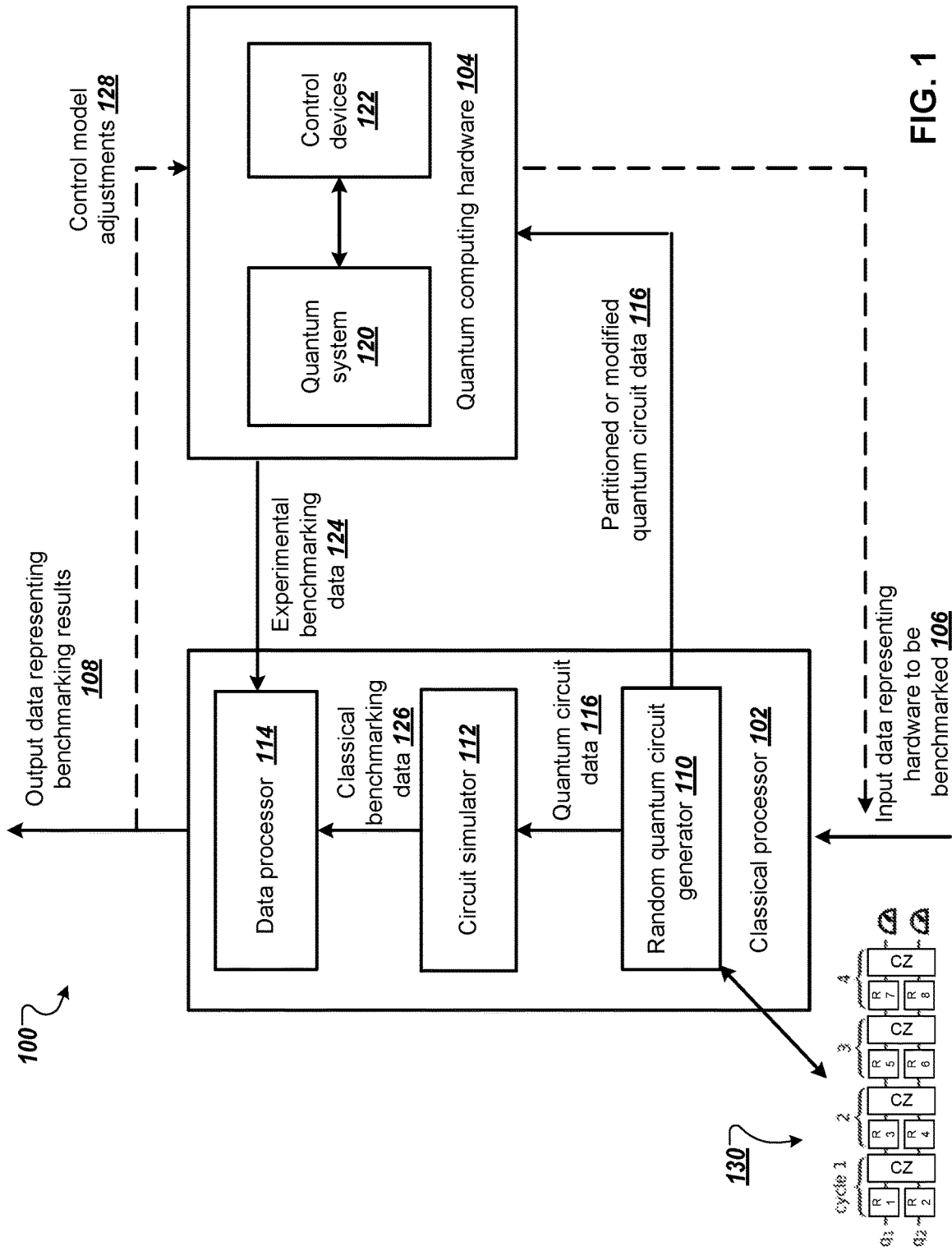
FIG. 1 depicts an example system for benchmarking the performance of quantum computing hardware.

A quantum circuit is a model for quantum computation in which quantum logic gates are applied in a specific sequence to a register of qubits to encode quantum information. In theory, any quantum algorithm can be implemented with high precision by applying a correctly chosen sequence of quantum logic gates. However, in practice quantum logic gates are error prone—instead of implementing a unitary quantum operation representing an ideal quantum logic gate, a corresponding noisy quantum operation is implemented.

The fidelity of a quantum operation is a measure of how close a noisy quantum operation $\varepsilon$ is to an ideal unitary quantum operation $\mathcal{U}$. The quantum logic gate fidelity between $\varepsilon$ and $\mathcal{U}$ U for a given quantum state $\rho$ may be given by $$\mathcal{F}_{\varepsilon,\mathcal{U}}(\rho) = \left(tr\left(\sqrt{\sqrt{\varepsilon(\rho)}\,\mathcal{U}(\rho)\sqrt{\varepsilon(\rho)}}\,\right)\right)^2.$$

Estimating quantum logic gate fidelity is an important procedure for adjusting or correcting quantum hardware that physically realizes quantum logic gates and, in turn, is an important procedure for performing successful quantum computations.

Conventional benchmarking techniques, e.g., cross-entropy benchmarking (XEB) methods or statistical methods, can be used to characterize how far the quantum states produced by a quantum machine are from the states expected for the ideal quantum operation, thus characterizing amount of errors. Benchmarking techniques typically include executing random quantum circuits on a quantum processor to determine probabilities of bit strings representing measurement results, using classical algorithms to simulate execution of the random quantum circuits to obtain corresponding ideal probabilities of the bit strings representing measurements results, and estimating fidelity using the probabilities according to the equations of the different methods.

The cost of implementing the classical algorithms to simulate execution of the random quantum circuits scales exponentially and therefore can become very expensive for increasing numbers of qubits or circuit depth. Conventional benchmarking techniques overcome this problem by estimating system fidelity for quantum circuits of increasing number or qubits, as long as the classical simulation is affordable. The system fidelity can also be estimated for circuits of the same number of qubits an increasing depth. The obtained fidelities can then be extrapolated to number of qubits and circuits depth that cannot be simulated at an affordable cost.

Conventional benchmarking techniques therefore rely on extrapolation, and cannot always provide accurate estimates of fidelity. In addition, as the complexity of quantum computations grow exponentially, experiments enter into complexity regimes that have not been explored before. In physics and engineering it is critical to be able to rely on measures, e.g., fidelity, that are as precise as possible when first exploring new regimes such as those with increasing complexity, number of qubits and circuit depth.

This specification describes techniques for simplifying the classical simulation required to estimate the fidelity of a full experiment. The techniques can provide accurate estimates of system fidelity with controllable classical computation cost.

One technique—herein referred to as "patch XEB"—includes spatially splitting the quantum circuit into two isolated patches by removing a slice of two-qubit gates. The remaining patches can then be easily simulated. For example, for a circuit of 50 qubits we can remove a slice of two-qubit gates approximately along the middle. The remaining two isolated patches are circuits with 25 qubits, easy to simulate.

Another technique—herein referred to as "elided XEB"—builds on patch XEB and reintroduces a few of the removed two-qubit gates to more closely mimic the full experiment while still maintaining simulation feasibility. The resulting circuit can be simulated with existing algorithms, e.g., the Schrödinger-Feynman algorithm (also called the Schrödinger-Feynman hybrid algorithm). The cost of these algorithms is exponential in the number of two-qubit gates across the line dividing the circuit where two-qubit gates are removed.

Example Hardware

FIG. 1 depicts an example system for benchmarking the performance of quantum computing hardware. The example system 100 is an example of a system implemented as classical and quantum computer programs on one or more classical and quantum computers in one or more locations, in which the systems, components, and techniques described below can be implemented.

The system 100 includes a classical processor 102 in data communication with quantum computing hardware 104. For convenience, the classical processor 102 and quantum computing hardware 104 are illustrated as separate entities, however in some implementations the classical processor 102 can be included in quantum computing hardware 104, e.g., the quantum computing hardware 104 can include one or more components for performing classical computing operations.

The quantum computing hardware 104 includes components for performing quantum computations using quantum circuits. For example, the quantum computing hardware 104 includes a quantum system 120 and control devices 122. The quantum system 120 includes one or more multi-level quantum subsystems, e.g., qubits, that are used to perform algorithmic operations or quantum computations. The specific realization of the multi-level quantum subsystems that the quantum computing hardware 104 includes and how they interact with one another is dependent on a variety of factors including the type of quantum computations that the quantum computing hardware is performing. For example, the multi-level quantum subsystems may include qubits that are realized via atomic, molecular or solid-state quantum systems. In other examples the qubits may include, but are not limited to, superconducting qubits or semi-conducting qubits.

The multi-level quantum subsystems can be frequency tunable. For example, each qubit may have associated operating frequencies that can be adjusted, e.g., using one or more control devices 122, through application of voltage pulses via one or more drivelines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tunable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The control devices 122 can further include measurement devices, e.g., readout resonators. Measurement results (measurement data) obtained via measurement devices may be provided to classical processors included in the quantum computing hardware 104 or to the classical processor 102 for processing and analyzing.

The classical processor 102 receives as input data 106 representing quantum hardware to be benchmarked. For example, the input data 106 may include data representing a quantum logic gate or quantum circuit that the quantum computing hardware 104 is configured to implement.

The classical processor 102 processes the received input data 106 to generate as output data 108 representing benchmarking results, e.g., properties of implementations of the quantum logic gate or quantum circuit. For example, the output data 108 may include data representing an estimated fidelity of quantum states output during implementations of a quantum logic gate or quantum circuit by the quantum hardware 104.

The classical processor 102 includes multiple components for processing received input data. For example, the classical processor 102 can include a random quantum circuit generator 110, classical simulator 112, and a data processing module 114.

The random quantum circuit generator 110 can be configured to define random quantum circuits based on the quantum computing hardware 104 and the received input data 106.

A random quantum circuit is a quantum circuit that includes one or more quantum gates that are randomly sampled from a predetermined set of quantum gates. The type of random quantum circuits defined by the random quantum circuit generator 110 is dependent on the benchmarking experiment being performed by the system 100.

For example, the random quantum circuit generator 110 can define multiple random quantum circuits that each include one or more respective randomly sampled single qubit gates. For example, the random quantum circuit generator 110 can be configured to randomly sample single qubit gates from a predefined set of single qubit gates, e.g., a set including $$X^{\frac{1}{2}},$$
$$Y^{\frac{1}{2}},$$

and T quantum gates, where $$X^{\frac{1}{2}}$$

represents a π/2 rotation around the X axis, $$Y^{\frac{1}{2}}$$

represents a π/2 rotation around the $y$ axis, and T represents a non-Clifford diagonal matrix $\{0, e^{i\pi/4}\}$. Within a single qubit benchmarking experiment, the single qubit gates included in the random quantum circuits defined by the random quantum circuit generator 110 can have approximately equal error rates, e.g., the error rate of each single qubit gate in a set of single qubit gates from which the random quantum circuit generator 110 samples from have a predetermine range of error rates.

The random quantum circuit generator 110 can also define multiple random quantum circuits that each include one or more respective randomly sampled single qubit gates and a same multi-qubit quantum gate. Again, within a multiple qubit benchmarking experiment, the single qubit gates included in the random quantum circuits defined by the random quantum circuit generator 110 can have approximately equal error rates.

The random quantum circuits defined by the random quantum circuit generator 110 can have different depths. The random quantum circuit generator 110 can define circuits of different depths by applying multiple clock cycles of gates. That is, the random quantum circuit generator 110 can define a random quantum circuit of depth d as being equal to d cycles of a same sequence of gates. In some implementations the random quantum circuit generator 110 can define a sequence of gates, e.g., including multiple randomly sampled single qubit gates followed by multiple multi-qubit gates, and define multiple random quantum circuits using the defined sequence of gates, where each defined random quantum circuit corresponds to a respective number of cycles of the defined sequence of gates. For example, the random quantum circuit generator can define 500 random quantum circuits corresponding to 1-500 cycles of the sequence of gates.

Quantum circuit 130 is an example of a random quantum circuit generated by the random quantum circuit generator 110. Example quantum circuit 130 shows a benchmarking quantum circuit that is configured to operate on two qubits $q_1$, $q_2$. The example quantum circuit 130 includes four cycles, where each cycle includes two randomly sampled single qubit gates $R_1$, $R_2$ that operate on qubits $q_1$, $q_2$, respectively, and a copy of a two-qubit quantum gate, e.g., in this example a CZ gate.

The classical processor 102 is configured to partition or modify random quantum circuits defined by the random quantum circuit generator 110. For example, the classical processor 102 can be configured to perform operations described below with reference to example processes 200 and 300 of FIGS. 2 and 3.

The classical processor 102 is configured to transmit data 116 representing partitioned or modified random quantum circuits to the quantum computing hardware 104. The quantum computing hardware 104 is configured to implement the partitioned or modified random quantum circuits using the quantum system 120 and control devices 122.

The quantum computing hardware 104 can provide as output data representing results of the circuit implementations, e.g., experimental benchmarking data 124, and transmit the data to the classical processor 102.

The classical processor 102 is also configured to provide the data 116 representing partitioned or modified benchmarking quantum circuits to the circuit simulator module 112. The circuit simulator module 112 is configured to perform classical computations to simulate implementations of the benchmarking quantum circuits defined by the data 116, e.g., to calculate output probabilities of ideal implementations of the constructed benchmarking circuits. As described below with reference to FIGS. 2 and 3, the circuit simulator 112 can be configured to perform separate simulations to implement sub-circuits in a partitioned benchmarking quantum circuit and can be configured to perform Schrödinger—Feynman algorithms or hybrid quantum simulation algorithms to simulate implementations of modified benchmarking quantum circuits.

The circuit simulator 112 can provide as output data representing results of the circuit simulations, e.g., classical benchmarking data 126, to a processing module 114 included in the classical processor 102.

The data processing module 114 is configured to process the experimental benchmarking data 124 received from the quantum computing hardware 104 and the classical benchmarking data 126 received from the circuit simulator 112.

Processing the experimental and classical benchmarking data can include applying cross-entropy benchmarking techniques where cross entropy is used as a measure of correspondence between the experimental benchmarking data and the classical benchmarking data representing the output distribution of the ideal circuits. For example, the data processing module 114 can be configured to determine a cross entropy (or an average cross entropy) of the experimental benchmarking data 124 (or respective portions thereof) and of the classical benchmarking data 126. The (average) cross entropy difference can be used as an estimate of the fidelity of the circuit being simulated—a property that holds for both incoherent errors and coherent errors, with the difference that in the case of coherent errors the fluctuations around the mean are larger than in the case of incoherent errors.

As described in more detail below with reference to FIGS. 2 and 3, the data processing module can be configured to determine a cross entropy (or an average cross entropy) of relevant portions of experimental benchmarking data 124 and classical benchmarking data 126 corresponding to classical simulations of implementations of sub circuits of a partitioned benchmarking quantum circuit. The average cross entropy differences can then be used as estimates of the fidelities of the sub circuits. The data processing module 114 can multiply determined estimates of fidelities of the sub circuits to obtain an estimate of the corresponding benchmarking quantum circuit defined by the random quantum circuit generator 110.

By estimating the fidelity of a circuit as a function of circuit depth, the data processing module 114 can further determine a measure of error-per-cycle by fitting the fidelity as a function of circuit depth to an exponential.

In some implementations the data processing module 114 can be configured to process or analyze estimated fidelity values to determine properties of the quantum computing hardware 104, e.g., its performance, or to calibrate, validate or benchmark the quantum computing hardware 104. In addition, the data processing module 114 may further generate as output data representing one or more adjustments 126 that may be used to adjust and improve the quantum computing hardware 104. For example, the data processing module 114 may use estimated fidelity values to determine adjustments to how the quantum computing hardware is controlled when implementing a particular quantum circuit or type of quantum circuits, e.g., determine modifications to the programming of the control devices 122 to achieve higher fidelity quantum gates. A parametrized control model may be used to determine the modifications, where the parameterized control model relates parameters of the quantum gates (e.g. phases, qubit rotation angles etc.) to physical parameters of the system/systems used to implement/control the quantum gate (e.g. voltages, pulse shapes, frequencies etc.) An outer loop may then be performed to find optimal experimental controls to improve the performance of the quantum computing hardware 104. For example, the method may be iterated until some threshold condition is met. The threshold condition may, for example, the optimisation of a control model to within a threshold value, and/or a threshold number of iterations.

Programming the Hardware

FIG. 2 is a flow diagram of a first example process 200 for estimating quantum processor performance. For convenience, the process 200 will be described as being performed by a system of one or more classical and quantum computing devices located in one or more locations. For example, the system 100 of FIG. 1, appropriately programmed in accordance with this specification, can perform the process 200.

The system defines a benchmarking quantum circuit configured to operate on an array of n qubits (step 202). As described above, the array of qubits can include a large number of qubits, e.g., 50 qubits or more. The defined benchmarking quantum circuit includes one or more cycles of quantum gates, where each cycle includes a respective layer of randomly sampled single qubit gates and a layer of multiple instances of a same multi-qubit gate.

To define the benchmarking quantum circuit, the system randomly samples multiple single-qubit quantum gates from a predetermined set of single-qubit quantum gates. For example, the system can randomly sample single-qubit quantum gates from a set of quantum gates that includes $$X^{\frac{1}{2}},$$
$$Y^{\frac{1}{2}},$$

and T quantum gates. Each randomly sampled single-qubit quantum gate corresponds to a respective cycle and a respective qubit in the array of qubits. For example, in some implementations a respective randomly sampled single-qubit quantum gate is assigned to each qubit in the array of qubits at each cycle, i.e., the total number of randomly sampled single-qubit quantum gates can be equal to the number of qubits n in the array multiplied by the number of cycles (circuit depth) d.

The system assigns the multiple randomly sampled single qubit gates to respective layers of randomly sampled single qubit gates. In some implementations the system may implement one or more rules for assigning the randomly sampled single-qubit quantum gates to the layers. For example, the system may implement a rule whereby any single-qubit quantum gate assigned to a qubit q in the array for a current layer should be different from the single-qubit quantum gate assigned to the qubit q in the array for the preceding layer.

Figure 4:
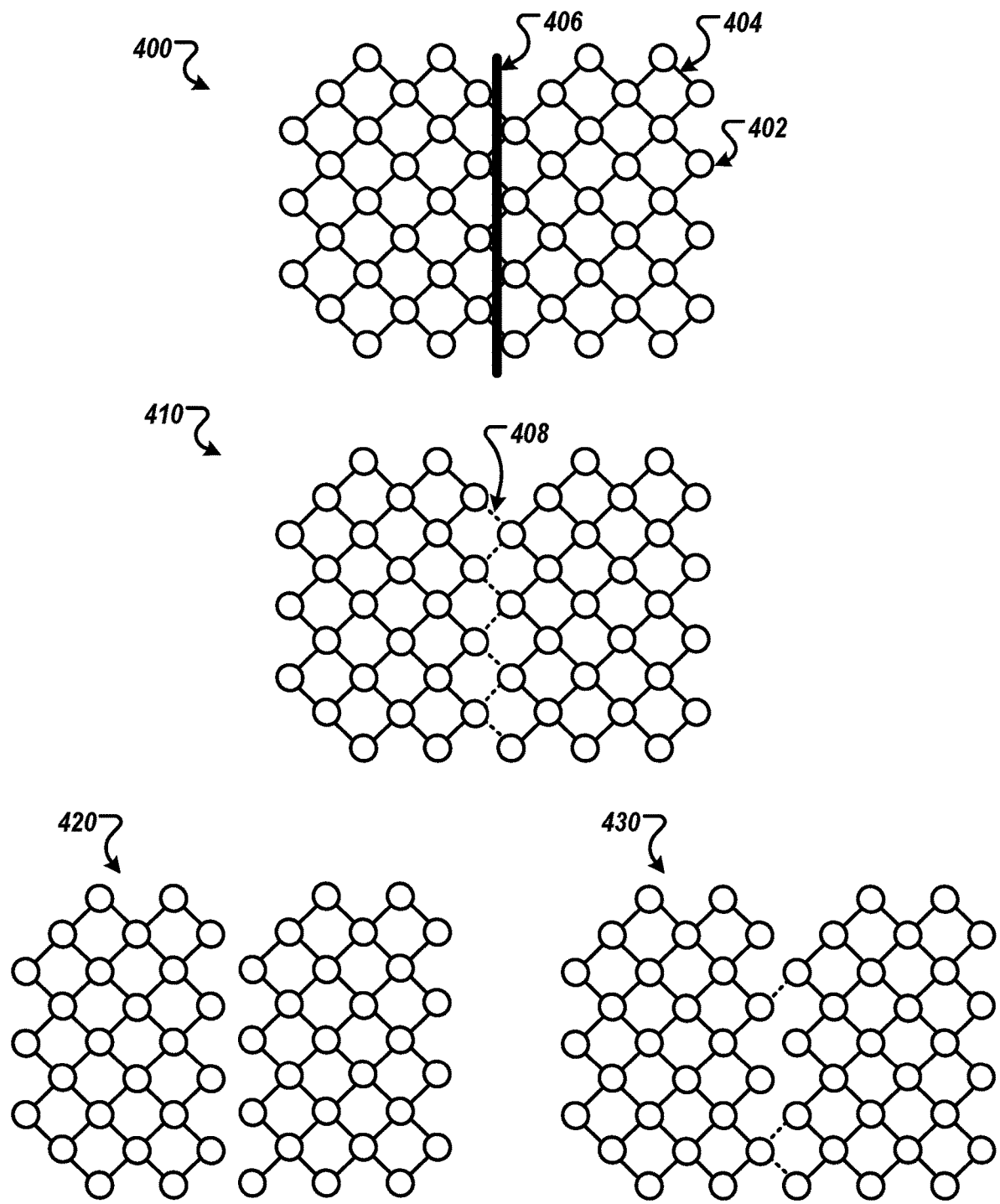
FIG. 4 shows an example illustration of partitioning a benchmarking quantum circuit.

The system also assigns instances of the multi-qubit quantum gate to the layers of multiple instances of the same multi-qubit gate. For example, each layer of multiple instances of the multi-qubit quantum gate may include multiple copies of a two-qubit gate, where each copy of the two-qubit gate operates on a respective pair of nearest neighboring qubits in the array of qubits. In some implementations the multiple copies of the two-qubit gate operate on all pairs of neighboring qubits in the array of qubits, as shown in FIG. 4 below.

The system partitions the defined benchmarking quantum circuit into two or more sub-circuits or "patches" (step 204). The system partitions the defined benchmarking quantum circuit into two or more patches by defining one or more boundaries in the array of qubits and removing all instances of the multi-qubit quantum gate along one or more boundaries in each layer of multiple instances of the multi-qubit gate. That is, in each cycle, a same boundary (or boundaries) is defined in the array of qubits and all multi-qubit quantum gates positioned on the boundary or that cross the boundary are removed. FIG. 4 shows an example boundary and illustrates removal of instances of a two-qubit quantum gate.

The boundary or boundaries can be chosen based on the computational capabilities of classical processors implementing the above described classical algorithms for simulating execution of the random quantum circuit. The number of qubits that can be efficiently simulated by the classical processor may be used to determine a patch size for dividing the array of qubits into patches. For example, if a classical processor can efficiently simulate execution of a random quantum circuit that operates on 25 qubits, the system may partition a defined benchmarking quantum circuit that is configured to operate on an array of 50 qubits into two patches of 25 qubits. As another example, if a classical processor can efficiently simulate execution of a random quantum circuit that operates on 25 qubits, the system may partition a defined benchmarking quantum circuit that is configured to operate on an array of 100 qubits into four patches of 25 qubits.

After the system partitions the defined benchmarking circuit into two or more patches, the defined benchmarking quantum circuit includes two or more sub-circuits that operate on a respective subset of qubits in the array of qubits. Each sub-circuit includes one or more cycles of quantum gates, where each cycle includes a respective layer of randomly sampled single qubit gates that operate on the qubits subset of qubits and a respective layer of multiple instances of the multi-qubit gate.

The system performs a benchmarking process using the partitioned benchmarking quantum circuit to determine a circuit fidelity of each of the two or more sub-circuits (step 206). Performing the benchmarking process includes implementing the partitioned benchmarking circuit to obtain experimental benchmarking data. Implementing the partitioned benchmarking circuit can include initializes each qubit in the array of qubits in an initial state $|0\rangle^{\otimes n}$, applying the partitioned benchmarking circuit to the initialized qubits in the array of qubits, and measuring each qubit in the array of qubits to obtain measurement data for each qubit. In some implementations the system may also apply a Hadamard gate to each qubit after initializing the qubits in the array of qubits in the initial state and before the partitioned benchmarking circuit is applied. The partitioned benchmarking circuit can be applied to the initialized qubits in a same experiment, i.e., the sub-circuits (corresponding to separate sub-systems of qubits) can be run approximately simultaneously (e.g., within limits of the quantum computing hardware performing the experimental implementation) in a same experiment. This enables effects such as gate and measurement crosstalk between patches to be captured in the implementation.

Performing the benchmarking process also includes classically simulating an ideal implementation of the partitioned benchmarking circuit. Classically simulating the partitioned benchmarking circuit includes separately simulating the sub-circuits of the partitioned benchmarking circuit. That is, the system performs two or more simulations, where each simulation corresponds to a respective sub-circuit. Each classical simulation produces classical benchmarking data that represents an output distribution of an ideal implementation of the sub-circuit.

The system can then compare classical benchmarking data representing an output distribution of an ideal implementation of each sub-circuit to the corresponding portions of the experimental benchmarking data (e.g., experimental benchmarking data taken from qubits on which each sub-circuit operates) to determine an estimate of the circuit fidelity of each of the two or more sub-circuits. For example, the system can apply cross-entropy benchmarking techniques to estimate fidelities of the implementations of the sub-circuits.

The system multiplies the determined circuit fidelities of each of the two or more patch fidelities to obtain an estimate of the fidelity of the defined benchmarking circuit (208).

Compared with full benchmarking processes, e.g., conventional XEB, the main difference between the fidelity obtained at step 208 and the fidelity obtained using conventional techniques is the absence of entanglement between the two or more patches. However, for sufficiently large systems such as 50 qubits or more, the multi-qubit gates removed at step 204 (and corresponding absence of entanglement) represent a small portion of the whole benchmarking quantum circuit defined at step 202. Therefore, the fidelity of the full benchmarking circuit can be accurately estimated as the product of the fidelities of the two subsystems.

In some implementations the example process 200 can be repeated for multiple benchmarking quantum circuits of the same circuit depth, and for multiple benchmarking circuits of different depths. For example, the system can repeat example process 200 for many circuits at different depths as part of a normal benchmarking process to estimate the fidelity as a function of circuit depth and determine a measure of error-per-cycle by fitting the fidelity as a function of circuit depth to an exponential.

In some implementations the system can determine one or more adjustments to quantum computing hardware using the estimated fidelity or fidelities, e.g., adjustments to control parameters of a control model used by the quantum computing hardware to implement quantum operations. The system can implemented the determined adjustments when performing future computations to improve the operation and/or performance of the quantum computing hardware.

FIG. 3 is a flow diagram of a second example process 300 for estimating quantum processor performance. For convenience, the process 300 will be described as being performed by a system of one or more classical and quantum computing devices located in one or more locations. For example, the system 100 of FIG. 1, appropriately programmed in accordance with this specification, can perform the process 300.

The system defines a benchmarking quantum circuit configured to operate on an array of n qubits (step 302). The defined benchmarking quantum circuit can take the same form as that described at step 202 of FIG. 2.

The system modifies the defined benchmarking quantum circuit (step 304). The system modifies the defined benchmarking quantum circuit by defining one or more boundaries in the array of qubits and removing a proper subset of instances of the multi-qubit quantum gate along the one or more boundaries in one or more of the layers of multiple instances of the multi-qubit gate. For example, the system can define one or more boundaries in the array of qubits and remove a fraction of instances of the multi-qubit quantum gate along the one or more boundaries in a predetermined number of cycles, e.g., in the first x<d cycles. FIG. 4 shows an example boundary and illustrates removal of a fraction of instances of a two-qubit quantum gate.

The system performs a benchmarking process using the modified benchmarking quantum circuit to obtain an estimate of the fidelity of the defined benchmarking circuit (step 306).

Performing the benchmarking process includes implementing the modified benchmarking circuit to obtain experimental benchmarking data, as described in step 206 of FIG. 2.

Performing the benchmarking process also includes classically simulating the modified benchmarking circuit to obtain classical benchmarking data. However, unlike step 206 and 208 of FIG. 2, by construction the modified benchmarking quantum circuit generated at step 304 does not include multiple disjoint patches. Therefore, the modified benchmarking quantum circuit cannot be separately classically simulated and separate fidelities cannot be multiplied together. Instead, to simulate the modified benchmarking circuit the system applies a Schrödinger-Feynman algorithm or a quantum simulation hybrid algorithm to perform the classical simulation.

A conventional method to simulate quantum circuits is a full state vector simulator or Schrödinger algorithm. The full quantum state, a complex vector, is kept in memory, and quantum gates (complex matrices or unitaries) are applied to the state vector sequentially. The dominant cost of this algorithm for n qubits is $2^n$, the size of the state vector in memory. In the Schrödinger-Feynman algorithm the system splits the lattice into multiple patches, e.g., two, and uses the Schmidt decomposition for the multi-qubit gates on the boundaries. If the Schmidt rank of each gate is r and the number of gates on the boundary is g then there are $r^g$ paths. The system simulates all the $r^g$ paths and sum the results. The total run time is proportional to $(2^{n_1}+2^{n_2})r^g$, where $n_1$ and $n_2$ are the qubit numbers in the first and second patches. Each patch is simulated by the Schrödinger algorithm. Path simulations are independent of each other and can be parallelized to run on supercomputers or in data centers.

It is noted that in example process 200 ("Patch XEB"), all multi-qubit gates were removed across the boundary, so g=0 and the simulation cost is $(2^{n_1}+2^{n_2})$. In example process 300 ("elided XEB") some of the multi-qubit gates are removed across the boundary. For example, in the benchmarking quantum circuit defined at step 302 there may be g=35 gates across the cut, and 20 gates may be removed at step 304 to define a modified benchmarking quantum circuit with g=15 gates across the boundary. As an example, the gates across the boundary could be control-Z quantum gates, which have Schmidt rank r=2. The cost of simulating the elided circuit is therefore $(2^{n_1}+2^{n_2})2^{15}$. The cost of the original circuit was $(2^{n_1}+2^{n_2})2^{35}$.

The system can then compare the classical benchmarking data to the experimental benchmarking data to estimate the fidelity of the benchmarking quantum circuit. For example, the system can apply cross-entropy benchmarking techniques to estimate the fidelity of the benchmarking quantum circuit.

As described above with reference to FIG. 2, in some implementations the example process 300 can be repeated for multiple benchmarking quantum circuits of the same circuit depth, and for multiple benchmarking circuits of different depths. For example, the system can repeat example process 300 for many circuits at different depths as part of a normal benchmarking process to estimate the fidelity as a function of circuit depth and determine a measure of error-per-cycle by fitting the fidelity as a function of circuit depth to an exponential.

In some implementations the system can determine one or more adjustments to quantum computing hardware using the estimated fidelity or fidelities, e.g., adjustments to control parameters of a control model used by the quantum computing hardware to implement quantum operations. The system can implemented the determined adjustments when performing future computations to improve the operation and/or performance of the quantum computing hardware.

Compared with patch XEB, elided XEB more closely approaches a description of the full system performance under a full XEB circuit—in addition to capturing issues such as control and readout crosstalk, elided XEB allows entanglement to form between the two weakly connected subsystems. It covers essentially all the possible processes that occur in the full XEB measurement, and therefore can be used to predict system performance at a dramatically reduced computational cost (albeit costlier than patch XEB).

FIG. 4 is an example illustration of partitioning or modifying a benchmarking quantum circuit. As described above with reference to steps 202 and 302, a benchmarking quantum circuit defined by the system includes one or more cycles of quantum gates, where each cycle includes a respective layer of randomly sampled single qubit gates and a layer of multiple instances of a same multi-qubit gate. FIG. 4 illustrates an example layer 400 of multiple instances of a two-qubit gate. In layer 400, circles represent qubits in the array of qubits on which the benchmarking quantum circuit operates. Solid lines between qubits represent instances of the two-qubit gate. In example layer 400, the two-qubit gate operates on each pair of neighboring qubits.

As described above with reference to steps 204 and 304, the system partitions or modifies the defined benchmarking quantum circuit into two or more patches by defining one or more boundaries in the array of qubits. Example layer 400 shows one defined boundary 406. Boundary 406 is positioned in the center of the array of qubits, however as described above with reference to FIG. 2, the system may define multiple boundaries and the position of the defined boundaries can vary.

As described above with reference to steps 204 and 304, the system can remove all or a fraction of instances of the multi-qubit quantum gate along the one or more boundaries in one or more of the layers of multiple instances of the multi-qubit gate. Example layer 410 shows candidate two-qubit gates, e.g., two-qubit gate 408, which can be removed. Example layer 420 shows two sub-circuits generated according to example process 200, where all two-qubit gates on or crossing the boundary 406 have been removed. As shown in FIG. 4, the resulting two sub circuits are disjoint and can therefore be classically simulated separately. Example layer 430 shows a resulting benchmarking quantum circuit after a fraction of two-qubit gates on or crossing the boundary 406 have been removed. As shown in FIG. 4, the resulting patches generated at step 304 are not disjoint and therefore cannot be classically simulated separately.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for estimating quantum processor performance, the method comprising:
    defining a benchmarking quantum circuit configured to operate on an array of qubits, wherein the benchmarking quantum circuit comprises one or more cycles of quantum gates, each cycle of quantum gates comprising a respective layer of randomly sampled single qubit gates and a layer of multiple instances of a same multi-qubit gate;
    modifying the defined benchmarking quantum circuit, comprising:
        defining one or more boundaries between qubits in the array of qubits,
        removing a proper subset of instances of the multi-qubit gate that cross the defined one or more boundaries; and
    performing a benchmarking process using the modified benchmarking quantum circuit to estimate a fidelity of the defined benchmarking quantum circuit.

2. The method of claim 1, wherein removing a proper subset of instances of the multi-qubit gate that cross the defined one or more boundaries comprises removing a proper subset of instances of the multi-qubit quantum gate that cross the one or more boundaries in a predetermined number of cycles of quantum gates.

3. The method of claim 1, wherein defining the benchmarking quantum circuit comprises:
    randomly sampling multiple single-qubit quantum gates from a predetermined set of single-qubit quantum gates, wherein each randomly sampled single-qubit quantum gate corresponds to a respective qubit in the array of qubits and to a respective cycle of the one or more cycles;
    assigning the randomly sampled multiple single-qubit quantum gates to respective layers of randomly sampled single qubit gates in the defined benchmarking quantum circuit; and
    assigning instances of the multi-qubit gate to the layers of multiple instances of the same multi-qubit gate.

4. The method of claim 1, wherein each layer of multiple instances of the multi-qubit quantum gate comprises multiple copies of a two-qubit gate, wherein each copy of the two-qubit gate operates on a respective pair of nearest neighboring qubits in the array of qubits.

5. The method of claim 4, wherein the multiple copies of the two-qubit gate operate on all pairs of neighboring qubits in the array of qubits.

6. The method of claim 1, wherein performing a benchmarking process using the modified benchmarking quantum circuit to estimate a fidelity of the defined benchmarking quantum circuit comprises:
  implementing the modified benchmarking quantum circuit using quantum computing hardware to obtain experimental benchmarking data;
  classically simulating an ideal implementation of the modified benchmarking quantum circuit, comprising performing a Schrödinger-Feynman algorithm to obtain classical benchmarking data;
  comparing the classical benchmarking data the experimental data to determine an estimated fidelity of the defined benchmarking quantum circuit.

7. The method of claim 1, wherein implementing the modified benchmarking quantum circuit using quantum computing hardware to obtain experimental benchmarking data comprises:
  initializing each qubit in the array of qubits in an initial state;
  applying the modified benchmarking quantum circuit to the initialized qubits; and
  measuring each qubit in the array of qubits to obtain measurement data for each qubit.

8. The method of claim 7, further comprising applying a Hadamard gate to each qubit after initializing each qubits in the array of qubits in the initial state and before the modified benchmarking quantum circuit is applied.

9. The method of claim 1, further comprising:
  defining multiple benchmarking quantum circuits configured to operate on the array of qubits, wherein the defined multiple benchmarking quantum circuits comprise quantum circuits with different circuit depths from a predetermined range of circuit depths; and
  estimating the fidelity of each defined benchmarking quantum circuit.

10. The method of claim 1, further comprising:
  determining one or more adjustments to quantum hardware control parameters based on the obtained estimate of the fidelity of the defined benchmarking quantum circuit; and
  implementing the determined one or more adjustments to perform quantum computations using quantum computing hardware.

11. An apparatus comprising one or more classical and/or quantum storage devices storing instructions that are operable, when executed by the one or more computers, to cause the one or more computing devices to perform operations comprising:
  defining a benchmarking quantum circuit configured to operate on an array of qubits, wherein the benchmarking quantum circuit comprises one or more cycles of quantum gates, each cycle of quantum gates comprising a respective layer of randomly sampled single qubit gates and a layer of multiple instances of a same multi-qubit gate;
  modifying the defined benchmarking quantum circuit, comprising:
    defining one or more boundaries between qubits in the array of qubits,
    removing a proper subset of instances of the multi-qubit gate that cross the defined one or more boundaries; and
  performing a benchmarking process using the modified benchmarking quantum circuit to estimate a fidelity of the defined benchmarking quantum circuit.

* * * * *